Patented Nov. 16, 1943

2,334,201

UNITED STATES PATENT OFFICE 2,334,201

NAPHTHALENE DERIVATIVES AND METHOD OF OBTAINING SAME

Wilbur F. Kamm, Grosse Pointe, and Benjamin F. Tullar, Grosse Pointe Woods, Mich., assignors to Parke, Davis & Company, Detroit, Mich., a corporation of Michigan No Drawing. Original application February 23, 1940, Serial No. 320,424. Divided and this application December 8, 1941, Serial No. 422,174

6 Claims. (Cl. 260—396)

The invention relates to new and valuable amino naphthol compounds and methods for obtaining the same.

This application is a division of our copending application, Serial No. 320,424, filed February 23, 1940.

This application relates more particularly to 3-methyl-4-amino-1-naphthol and its corresponding water-soluble ammonium-type acid addition salts. These compounds are of value as therapeutic agents for they have the property of reducing the coagulating time of the blood of humans and animals. Thus they are useful for their antihemorrhagic properties, but they are also valuable as intermediates for the preparation of other therapeutically useful products. The formula of the new compounds may be represented as follows,

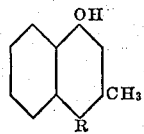

where R is a radical of the group consisting of amino and water-solubilizing ammonium-type salt radicals derived therefrom.

The invention also relates to certain intermediates which are capable of being converted into the antihemorrhagic compounds of the invention. Amongst these are the heretofore unknown compound 1-hydroxyl-amino-2-methyl-naphthalene having a melting point of about 98° C.

The following examples illustrate the invention:

EXAMPLE 1.—*3-methyl-4-amino-1-naphthol and its salts obtained from 1-nitro-2-methyl-naphthalene*

12.5 grams of 1-nitro-2-methyl-naphthalene are dissolved in 25 cc. of alcohol and added to a solution of 1 gram of ammonium chloride in 10 grams of water and the mixture heated to 65–70° C. 15 grams of zinc are added to the heated solution over a period of about 17 minutes. The reaction mixture is filtered, the solid on the filter washed with alcohol and the filtrate poured into 200 cc. of cold water. The precipitate of 1-hydroxylamino-2-methyl-naphthalene is filtered off, sucked dry on the filter and washed with petroleum ether. It can be taken up in benzol and crystallized therefrom by concentration of the benzol solution to give a pure product melting at 97–98° C. This is a new compound and has the following formula,

The 1-hydroxylamino-2-methyl-naphthalene is rearranged into 3-methyl-4-amino-1-naphthol as follows. 5 grams of 1-hydroxylamino-2-methyl-naphthalene are added to 80 cc. of dilute sulfuric acid (5 grams of concentrated H$_2$SO$_4$ in 75 grams water) at 0° C. The mixture is allowed to stand for 1 hour during which time the insoluble sulfate of 3-methyl-4-amino-1-naphthol separates out. The mixture is made alkaline with sodium hydroxide solution and the alkaline solution extracted with ether. The extracted solution is then neutralized with dilute sulfuric acid, whereupon the crystalline 3-methyl-4-amino-1-naphthol free base precipitates out. The pure free base has a melting point of 202–203° C. If the product is not sufficiently pure, it may be taken up in dilute hydrochloric acid, the solution extracted with ether and then neutralized with sodium carbonate solution to separate out the free base. The free base can then be crystallized again from alcohol.

The reactions of this example are indicated by the following,

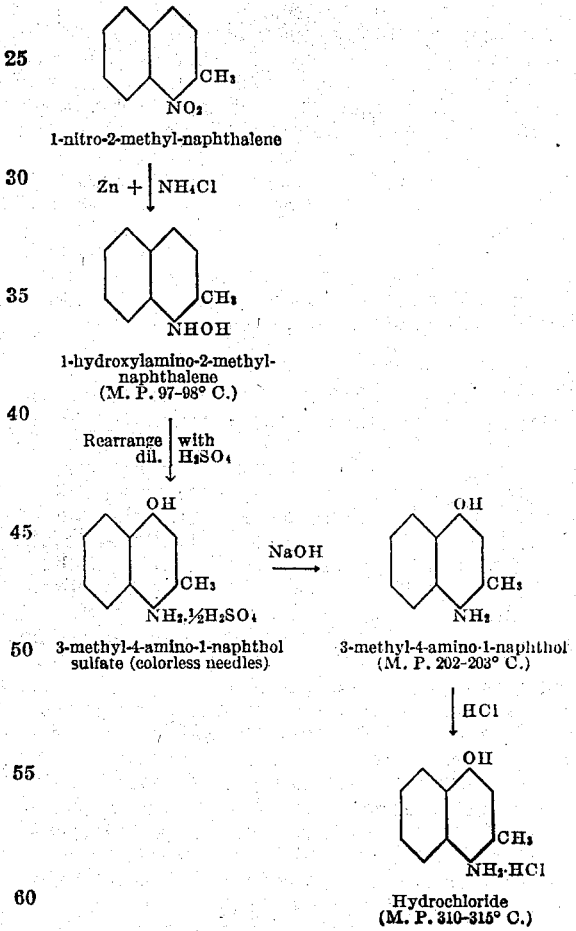

EXAMPLE 2.—*3-methyl-4-amino-1-naphthol and its salts obtained from 1-amino-2-methyl naphthalene*

Diazotized sulfanilic acid is first prepared for reaction with 1-amino-2-methyl-naphthalene as follows. 34.5 grams of sulfanilic acid are mixed with 20 cc. of 10 N sodium hydroxide and a solution of 16 grams of sodium nitrite in 200 cc. of water is added. This mixture is added slowly and while stirring vigorously to a mixture of 150 cc. of concentrated sulfuric acid in 700 grams of ice. After stirring the reaction mixture for 30 minutes to complete the crystallization of the diazotized sulfanilic acid, it is filtered on a suction filter, washed with water and sucked dry.

The diazotized sulfanilic acid is added with vigorous stirring to 25 grams of 1-amino-2-methyl-naphthalene hydrochloride in 1 liter of water and stirred for 1 hour. A sufficient quantity of sodium hydroxide solution to dissolve the azo dye coupled-product is added and the sodium salt of 3-methyl-4-amino-1-naphthalene diazobenzene sulfonic acid salted out by adding sodium chloride. The salted out product is then filtered off.

25 grams of the sodium salt of the sulfonic acid thus obtained are suspended in 300 cc. of boiling acetic anhydride, 700 cc. of acetic acid added, and the mixture boiled for 1 hour. A clear solution is obtained from which the acetic acid and its anhydride are distilled off in vacuo. The residue is the sodium salt of 3-methyl-4-acetylamino-1-naphthalene diazobenzene sulfonic acid. This residue is dissolved in 400 cc. of hot water and the free acid precipitated from the solution by adding 1 equivalent of hydrochloric acid. To this mixture there is then added 1 equivalent of ethanol amine and 25 grams of NaCl to form the crystalline ethanol amine salt of 3-methyl-4-acetylamino-1-naphthalene diazobenzene sulfonic acid. A gelatinous precipitate, instead of crystals, will form unless NaCl is used. The crystals are filtered off and dried in air.

The reduction of the ethanol amine salt of 3-methyl-4-acetylamino-1-naphthalene diazobenzene sulfonic acid to give 3-methyl-4-acetylamino-1-naphthyl amine is carried out as follows. 25 grams of the ethanol amine salt are mixed with 250 cc. of absolute ethyl alcohol and 1 gram of Raney nickel catalyst and then treated with hydrogen under pressure at 80–90° C. for a period of 3 hours. The hydrogenated mixture is cooled and filtered to remove the catalyst and most of the ethanol amine salt of sulfanilic acid which separates out during the reduction. The filtrate is diluted with an equal volume of water and cooled to cause crystallization of the 3-methyl-4-acetylamino-1-naphthyl amine. The latter compound is filtered off and dried in the air to give 10 grams of cotton-like needles of melting point 190–192° C. after preliminary softening at 120° C.

The 1-amino group of this compound of melting point 190–192° C. is diazotized and converted to a hydroxyl group as follows.

2 grams of 3-methyl-4-acetylamino-1-naphthyl amine are added to a mixture of 3.3 cc. of concentrated sulfuric acid and 13 grams of ice. To the cool solution thereby obtained there is slowly added 1 gram of sodium nitrite in 3 cc. of water. An insoluble sulfate forms but gradually dissolves to give a clear solution as the diazotization is completed. The solution from the diazotization is then added slowly to 20 cc. of 50% sulfuric acid solution. The mixture is allowed to stand until the evolution of nitrogen ceases. The product is diluted with 2 volumes of ice water, treated with charcoal, and filtered to give a colorless solution and then neutralized with sodium carbonate solution to precipitate out 3-methyl-4-amino-1-naphthol. The latter product is filtered off and may, if desired, be recrystallized from dilute alcohol. It has a melting point of 203° C.

The transformations of this example may be illustrated as follows:

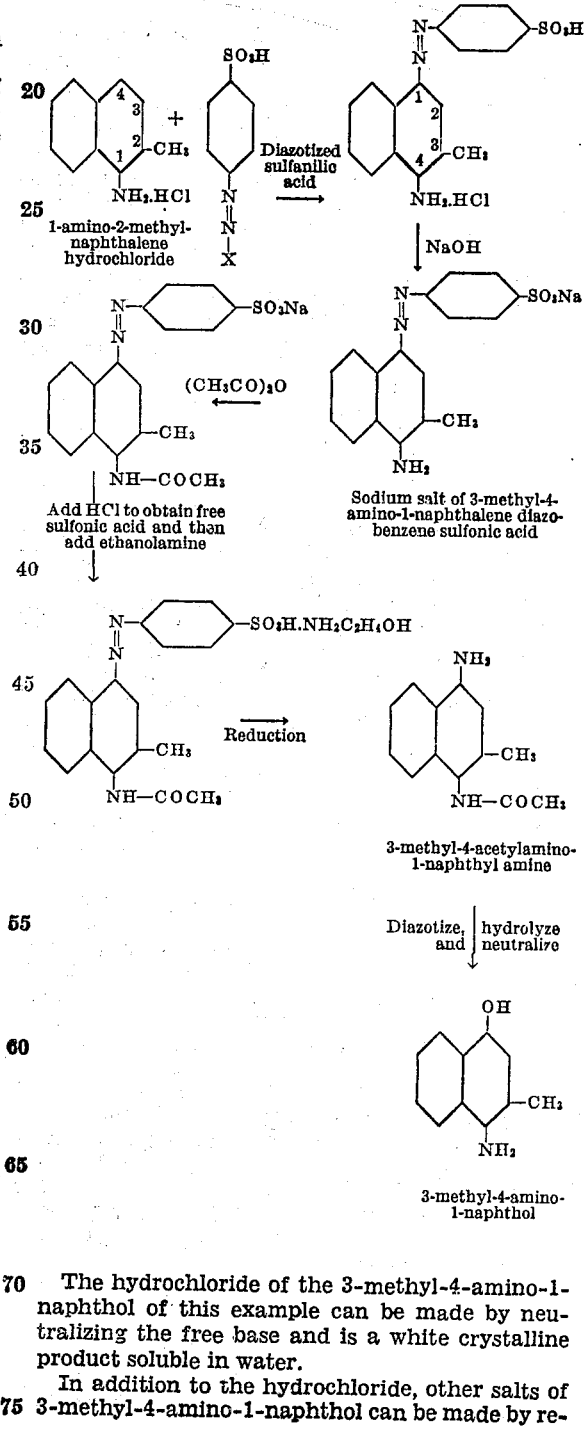

The hydrochloride of the 3-methyl-4-amino-1-naphthol of this example can be made by neutralizing the free base and is a white crystalline product soluble in water.

In addition to the hydrochloride, other salts of 3-methyl-4-amino-1-naphthol can be made by reacting the free base with the appropriate acid. For example, sulfuric acid, malonic acid, ascorbic acid, oxalic acid and the like can be used to obtain the corresponding salts.

In this example, the ethanolamine salt of the coupled diazo sulfonic acid is used, because it has the advantage of forming an insoluble ethanolamine salt of sulfanilic acid which is readily separated, along with catalyst, from the desired 3-methyl-4-acetylamino-1-naphthyl amine. However, other salts of the azo-coupled product can be used and the desired naphthyl amine separated from the sulfanilic acid by means of differences in solubility.

Other variations can also be practiced. For example, it is not necessary to use catalytic reduction. Other methods of reduction can be employed, such as reduction with alkali hydrosulfite.

EXAMPLE 3. — *3-methyl-4-amino-1-naphthol obtained from 1-amino-3-methyl-naphthalene*

3.2 grams of 1-amino-3-methyl-naphthalene (melting point 51-52° C.) are suspended in 50 cc. of 6N $H_2SO_4$ and cooled to 0° C. 1.5 grams of sodium nitrite in 15 cc. of water are added slowly while stirring the cold suspension at 0–5° C. When diazotization is completed, the reaction mixture is poured slowly into boiling 50% sulfuric acid and the mixture boiled for 15 minutes. It is then cooled to 0° C., filtered and the residue from the filtration extracted with dilute sodium hydroxide solution. The solution is then charcoaled and the filtrate acidified to cause separation of 3-methyl-1-naphthol.

3.2 grams of 3-methyl-1-naphthol are dissolved in 200 cc. of N/10 sodium hydroxide solution and 5 grams of moist, freshly diazotized sulfanilic acid added, while stirring well to complete the reaction of coupling the naphthol with the diazotized sulfanilic acid. The coupled product is separated almost quantitatively by adding about 25 grams of NaCl to the solution. The coupled product is neutralized with dilute hydrochloric acid and reacted with 1% aqueous solution of ethanolamine. The ethanolamine salt which forms is salted out with NaCl.

8 grams of the ethanolamine salt of 4-(4'-sulfonobenzeneazo)-3-methyl-1-naphthol are suspended in 250 cc. of absolute ethyl alcohol, 0.5 gram of Raney nickel catalyst added and the mixture reduced at 80–90° under 60 lbs. hydrogen pressure for two hours. After filtering off the catalyst and the ethanolamine salt of sulfanilic acid, one-half of the filtrate is concentrated in vacuo to 25 cc., diluted with 50 cc. of hot water and treated with decolorizing charcoal. The charcoal mixture is filtered and the filtrate cooled to form crystals of 4-amino-3-methyl-1-naphthol which are filtered off and dried. The crystals have a melting point of 203° C.

The other half of the filtrate containing 4-amino-3-methyl-1-naphthol is treated with excess alcoholic HCl, ether added and the mixture cooled. The hydrochloride of 4-amino-3-methyl-1-naphthol crystallizes out and after separating it and drying, it has a melting point of 312–315° C.

Instead of reducing the coupled product of this example by use of catalytic reduction, sodium hydrosulfite may be used. Furthermore, it is not necessary to form the ethanolamine salt of the coupled product before reducing the same to the amino-methyl-naphthol.

The transformations of this example may be illustrated by the following:

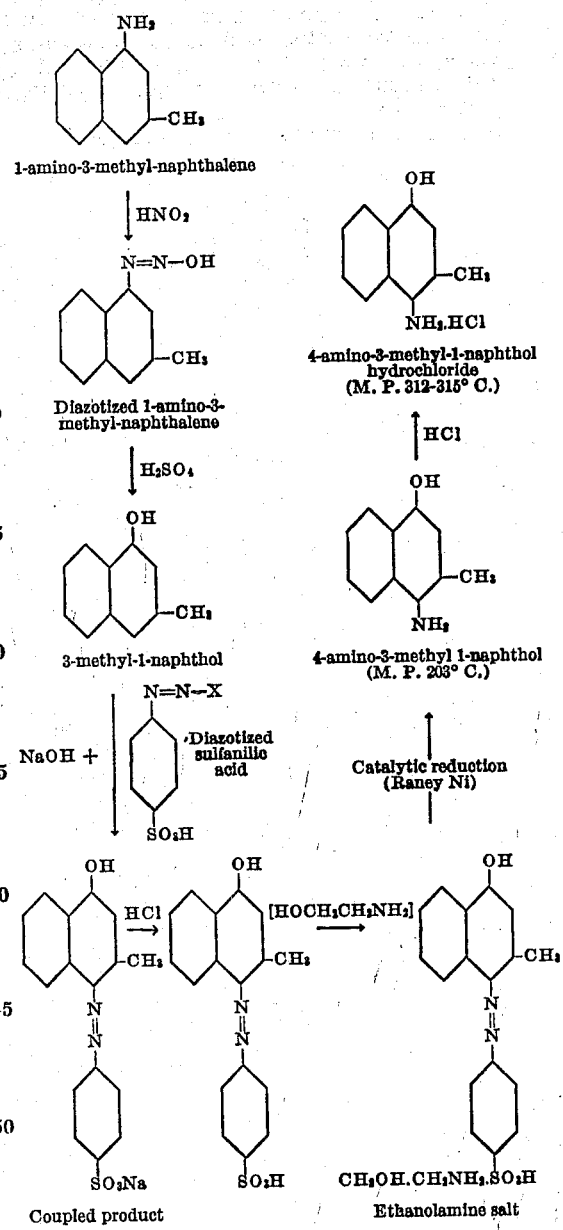

The free base 3-methyl-4-amino-1-naphthol obtained by the processes set forth in any of the preceding Examples 1 to 3 can be put up in vegetable oil solution, such as olive, peanut or coconut oil solutions, for oral administration and is useful in such form as an antihemorrhagic agent. The hydrochloride has the advantage that it is water-soluble and can be administered orally or by injection in order to decrease the blood coagulation time in patients who are deficient in antihemorrhagic vitamins.

By using another acid, such as sulfuric or phosphoric, or other mineral acid, or carboxylic acids, such as lactic acid, oxalic acid, tartaric acid, etc., instead of the hydrochloric acid one can obtain other water-soluble salts. Various salt-forming acids can be used for this purpose. For example, hydrochloric acid gives a hydrochloride of melting point 310–315° C., which is soluble in cold water to the extent of about 1.5%, while sulfuric acid gives a sulfate in the form of colorless needles which darken at 270° C. and char at about 300° C. and is only slightly soluble in water. Other salts of 4-amino-3-methyl-1-naphthol can be made in the same manner. Most of the ammonium type salts, such as the phosphate, nitrate, sulfamate, citrate and tartrate, etc., are water-soluble and give clear aqueous solutions.

What we claim as our invention is:

1. A compound having the formula

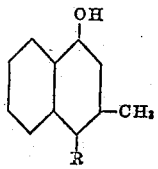

where R is a radical of the group consisting of primary amino and its corresponding water-solubilizing acid addition salt radicals.

2. 3-methyl-4-amino-1-naphthol and its corresponding water-soluble acid addition salts.

3. 3-methyl-4-amino-1-naphthol.

4. A water-soluble acid addition salt of 3-methyl-4-amino-1-naphthol.

5. The hydrochloride of 3-methyl-4-amino-1-naphthol.

6. A mineral acid addition salt of 3-methyl-4-amino-1-naphthol.

WILBUR F. KAMM.
BENJAMIN F. TULLAR.